United States Patent
Bentz

(10) Patent No.: US 7,039,751 B2
(45) Date of Patent: *May 2, 2006

(54) PROGRAMMABLE CACHE SYSTEM

(75) Inventor: Ole Bentz, Portland, OR (US)

(73) Assignee: Micron Technology, Inc., Boise, ID (US)

( * ) Notice: Subject to any disclaimer, the term of this patent is extended or adjusted under 35 U.S.C. 154(b) by 100 days.

This patent is subject to a terminal disclaimer.

(21) Appl. No.: 10/860,013

(22) Filed: Jun. 4, 2004

(65) Prior Publication Data

US 2004/0220978 A1    Nov. 4, 2004

Related U.S. Application Data

(63) Continuation of application No. 09/903,565, filed on Jul. 13, 2001, now Pat. No. 6,763,420.

(51) Int. Cl.
  *G06F 12/00* (2006.01)
(52) U.S. Cl. .................. 711/3; 711/133; 711/134; 711/216; 345/552; 345/557
(58) Field of Classification Search ............... 711/133, 711/134, 3, 216; 345/552, 557
See application file for complete search history.

(56) References Cited

U.S. PATENT DOCUMENTS

| 6,026,470 A | 2/2000 | Arimilli et al. |
| 6,223,255 B1 | 4/2001 | Argade |
| 6,233,647 B1 | 5/2001 | Bentz et al. |
| 6,397,298 B1 | 5/2002 | Arimilli et al. |

OTHER PUBLICATIONS

Fujiwara et al., "A Custom Processor for the Multiprocessor System ASCA", Keio University, Japan, pp. 1-4.

*Primary Examiner*—Mano Padmanabhan
*Assistant Examiner*—Mehdi Namazi
(74) *Attorney, Agent, or Firm*—Dickstein Shapiro Morin & Oshinsky LLP

(57) ABSTRACT

A plurality of cache addressing functions are stored in main memory. A processor which executes a program selects one of the stored cache addressing functions for use in a caching operation during execution of a program by the processor.

12 Claims, 2 Drawing Sheets

PROGRAMMABLE CACHE SYSTEM

This application is a continuation of application Ser. No. 09/903,565, filed Jul. 13, 2001 now U.S. Pat. No. 6,763,420, the subject matter of which is incorporated by reference herein.

FIELD OF THE INVENTION

The present invention relates generally to cache addressing functions, and, more particularly, to a method and apparatus for storing and using cache addressing functions.

BACKGROUND OF THE INVENTION

Cache is used to increase the speed with which a computer accesses data with minimal added expense. It is a block of memory that is much smaller and faster than a computer's main memory. A cache stores a group of byes in a small, fast memory. Once those bytes are no longer needed, they are flushed out to the larger, slower memory, and another set of bytes can be loaded into the cache.

The concept of caching is based on the observation that computers usually access data by temporal and spatial locality. In other words, if a byte has been accessed recently, then the bytes stored immediately next to it are much more likely to be accessed sooner than bytes that are not in the immediate vicinity of the recently accessed byte. For example, when a program is stored in RAM, the storage space in the RAM is filled up in the same way that bricks are laid down for a wall—one in front of the other until the row is completed, then another row on top. So, if each brick represents an instruction in a program and the first brick in the seventh row is "accessed," then the most likely place for the next instruction in the program to be stored is in the second brick in the seventh row. This information is useful because when a processor stores a byte in its cache, it can also read the following bytes and store them in the cache. This will result in fewer accesses to the RAM and/or a hard drive. Since a cache is faster than other memory, the more frequently a processor can obtain the desired information from the cache, the faster the apparent speed of the processor.

Caching has been widely used in many applications, including, for example, in processor controlled graphics accelerators. Graphics accelerators cache texture images and generally achieve a very good performance due to a reduction in accesses to external memory. Texture images are inherently 2-dimensional data sets of size "width" by "height" measured in number of pixels. Each pixel in a texture image is addressed by coordinate data (u,v) where u represents the horizontal axis and v represents the vertical axis.

When caching a group of data, one of the key issues to resolve is where a group of data should be stored in the cache. In the simplest case, a cache with only one entry, there is no choice. For a cache with two entries, a decision has to be made about whether to save a group of data in entry 0 or entry 1. For a typical cache with 32, 64, 128 or more entries, the decision must follow a carefully designed cache addressing algorithm that yields desired results.

A cache address algorithm can be based on a variety of information. For example, for storing texture images, a cache address can be assigned to each texture image based on the texture image's address in main memory. Another approach uses the coordinates of the texture in the larger image to determine which cache address to use; this exploits the 2-dimensional nature of texture images.

A cache address algorithm can either be direct mapped or n-way associative. A direct mapping means that a group of bytes will be stored in the cache in 1 location only. This scheme is easy and cheap to implement, but it does not perform as well as n-way associative schemes. In a 2-way associative cache, a group of bytes will be stored in 1 of 2 possible locations. The choice of which location to use depends on the replacement algorithm which can be least recently used (the entry that has not been accessed for the longest period of time will be overwritten with the new entry), first in first out (the entry that has been written into the cache for the longest period of time will be overwritten), most recently used (the last entry to be accessed will be overwritten), etc. A 2-way scheme tends to perform better than a direct mapping algorithm, but it is also more complex because more information has to be considered before deciding on a cache address. More complex schemes use 4-way, 8-way, etc. all the way up to fully associative caches. The benefit of the more complex schemes is performance, but the cost, complexity, chip area, and design time detract from their desirability. Different cache addressing schemes may be better suited for different application programs.

One way that a direct mapping algorithm for caching 2-dimensional texture data can be improved significantly is by hashing the address. Hashing is a method of storing and retrieving data entries. Rather than storing an entry based on the data in the entry, a shorter data key is assigned based on the data. A shorter data key allows an entry to be found in less time than a longer string of data.

For storing texture images in a cache, the coordinate bits may be logically exclusive OR'd (XOR'd) together to form a cache address. There are many different ways to select which bits of the coordinate bits to XOR together, but once the choice is made, it is designed into the hardware and is unchangeable after a cache integrated circuit is fabricated. Many cache integrated circuits have several pre-determined cache addressing schemes to accommodate various caching modes and provide greater flexibility in performing caching function, but once the chip is fabricated, only the pre-determined modes can be used. If other cache addressing schemes are desired, they are not available.

Therefore, there exists a desire and a need for a method and apparatus for permitting the modification of cache address computation functions after a cache chip is fabricated.

BRIEF SUMMARY OF THE INVENTION

The present invention mitigates the problems associated with the prior art and provides a unique method and apparatus for modifying cache address computation functions after a cache chip is fabricated.

In accordance with an exemplary embodiment of the present invention, one or more cache addressing functions can be stored as software instead of being hardwired into a cache when it is manufactured. A selected cache addressing function can then be used in accordance with a particular application program being run on a processor. Cache addressing algorithms can thus be easily added or deleted after the cache is manufactured.

BRIEF DESCRIPTION OF THE DRAWINGS

The above and other features and advantages of the invention will be more readily understood from the following detailed description of the invention which is provided in connection with the accompanying drawings.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to make and use the invention, and it is to be understood that structural changes may be made and equivalent structures substituted for those shown without departing from the spirit and scope of the present invention.

Figure 2:
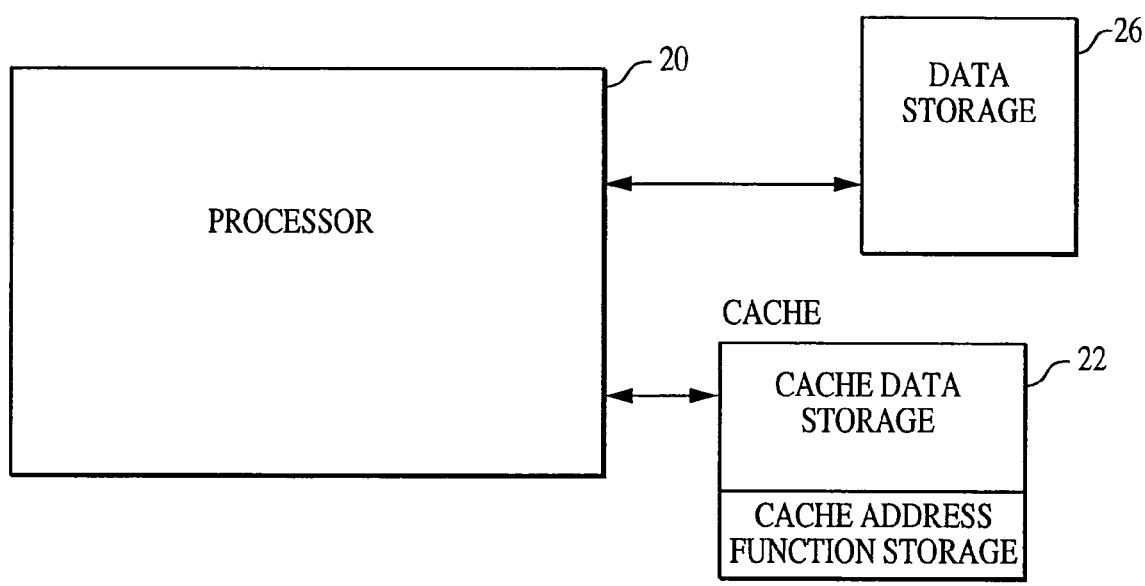
FIG. 2 is a block diagram of an apparatus that can use programmable cache addressing functions.

In accordance with an exemplary embodiment of the present invention, a system stores cache addressing functions as software rather than hardwiring the cache addressing functions into a cache. When processor 20, shown in FIG. 2, executes a program, processor 20 accesses data storage 26 to retrieve a cache addressing function, which may be associated with the program being executed, and stores the cache addressing function in cache 22 at a cache address function storage area for use in caching operations during program execution. Rather than hardwiring a few different cache addressing functions permanently into cache 22, only the cache addressing function currently being used is stored in cache 22. As a result, cache 22 has more storage space available for caching data and many more cache addressing functions can be accessed from data storage 26 and used for caching operations.

One exemplary use of the present invention is for a cache that employs a direct mapping algorithm with cache address hashing, (i.e. logical XORing of a set of multi-bit signals) as described above. Rather than hardwiring into cache 22 which bits comprise the multi-bit signals, a plurality of cache addressing functions are stored in data storage 26. Cache addressing functions can be stored and deleted from data storage 26 at any time.

The selected cache addressing function stored in data storage 26 determines which bits comprise the multi-bit signals. A particular cache addressing function is selected when a program that employs cache 22 is executed by processor 20. Once a cache addressing function is selected by processor 20, it is stored in cache 22 while the program is executed. The multi-bit signals are calculated by processor 20 using the selected cache addressing function while basic tasks, such as the XORing of bits and adding offsets, are performed by the cache hardware.

Figure 1:
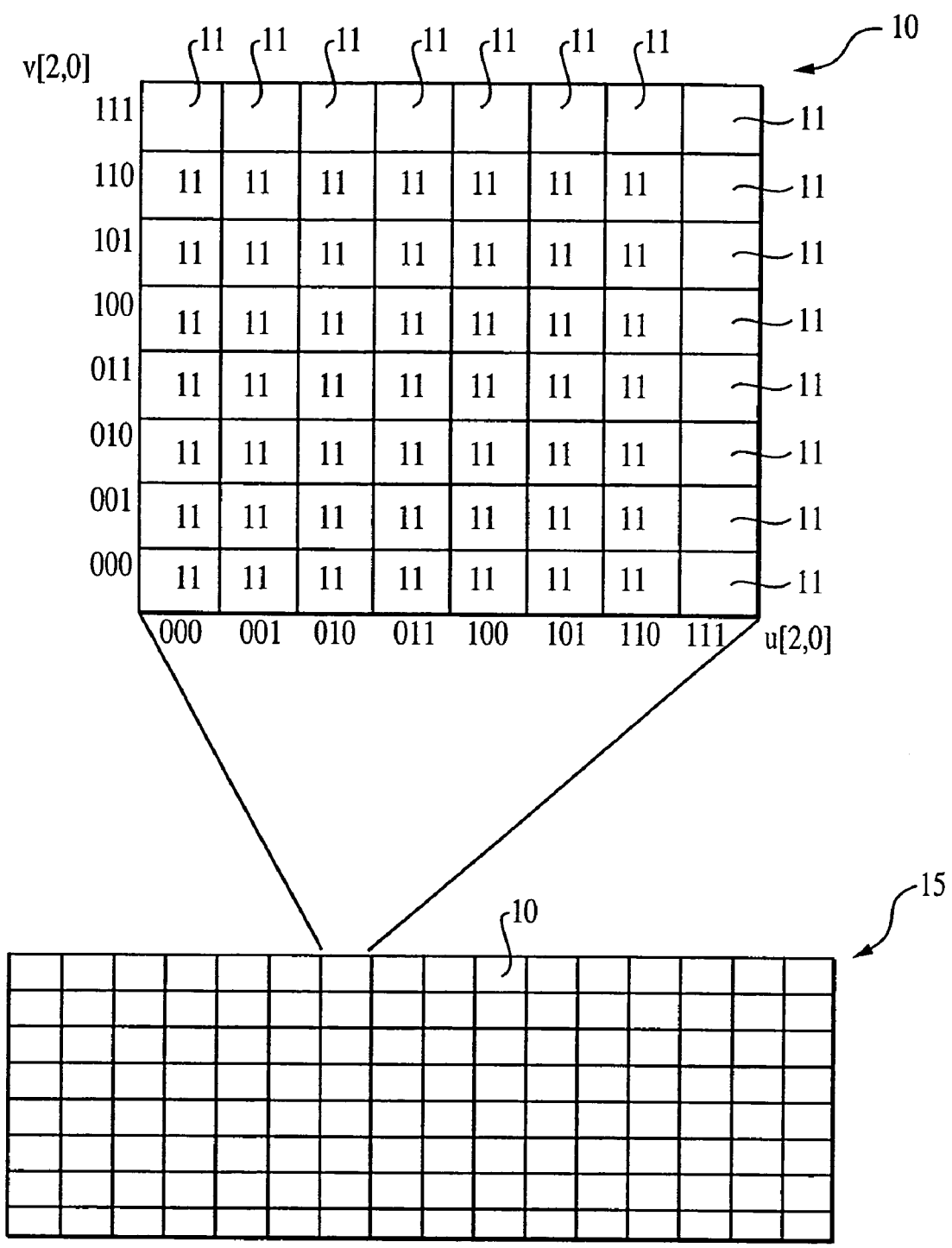
FIG. 1 is an illustration of an 8×8 pixel cache entry for a graphics processor.

In a 128 entry cache 15, shown in FIG. 1, where each entry 10 is capable of holding an 8×8 pixel portion of a texture image, the multi-bit signals that are the inputs to the cache addressing function are the coordinates (u,v). Coordinates (u,v) comprise the address in the larger image to be displayed that the texture will be applied to. In addition, a multi-bit signal indicating the Level of Detail ("LOD"), as determined by the program using cache 22, is input into the cache addressing function.

Each multi-bit address signal is made up of 10 bits. The three least significant bits (e.g. the three least significant bits in multi-bit string 1110111<u>010</u> are 010) from each of u and v are used to address each pixel 11 within a cache entry 10.

The remaining bits of u and v, bits 3–9 (e.g. the seven remaining bits in multi-bit string <u>1110111</u>010 bits 1110111), are input into the cache addressing function to determine which entry in the 128 entry cache 15 to store the texture image in. The three multi-bit signals are composed and logically XOR'd together. Each of these three signals comprise 7-bits and are composed as follows:

signal 1 [0] = u[3] or 0
signal 1 [1] = 0
signal 1 [2] = u[4] or 0
signal 1 [3] = u[5] or 0
signal 1 [4] = u[7] or 0
signal 1 [5] = u[8] or 0
signal 1 [6] = u[6] or 0
signal 2 [0] = 0
signal 2 [1] = v[3] or 0
signal 2 [2] = v[4] or v[5] or v[6] or v[7] or v[8] or 0
signal 2 [3] = v[4] or v[5] or v[6] or v[7] or 0
signal 2 [4] = v[4] or v[5] or 0
signal 2 [5] = v[5] or v[6] or 0
signal 2 [6] = v[5] or 0
signal 3 [0] = 0
signal 3 [1] = 0
signal 3 [2] = u[6]     or LOD [0]     or 0
signal 3 [3] = v[6]     or v[7]        or v[8]         or u[9] or LOD[0] or 0
signal 3 [4] = u[6]     or v[9]        or LOD [0]      or 0
signal 3 [5] = u[6]     or LOD [0]     or 0
signal 3 [6] =          or 0
LOD[0]

Where there is a choice (indicated by the word "or") there is flexibility. While these choices are normally made during the design of the cache (i.e. setting signal 1 [0] to always be u[3], setting signal 1 [2] to always be u[4], etc.), the present invention allows software to choose a different arrangement each time a program is executed without reducing the amount of storage space available for cache enties. While a few variations on which bits to select for each bit of the three multi-bit signals can be retained in the hardware, the full spectrum of variations are retained by using software. The present invention also allows cache addressing functions to be added or deleted after a cache is fabricated.

Each bit of the three signals depicted above is XOR'd with the corresponding bits from the other two signals to form a fourth signal (i.e. signal 4 [0]=signal 1 [0] XOR signal 2 [0] XOR signal 3 [0], signal 4 [1]=signal 1 [1] XOR signal 2[1] XOR signal 3[1], etc.). When Signal 4 is computed, by XORing each bit of signals 1, 2, and 3 together, Signal 4 will be a 7 bit number.

This 7 bit number can be used to select which entry in the 128 entry cache 15 to store the texture image. If 128 entry cache 15 is a two-dimensional array that is 8 entries by 16 entries, as depicted in FIG. 1, 3 bits are necessary to select the row and 4 bits are necessary to select the column. The three most significant bits can be used to determine the row in 128 entry cache 15 and the four least significant bits to determine the column (i.e. if signal 4=1100001, the entry would be 110 for the row and 0001 for the column) or the four most significant bits can be used to determine the column and the three least significant bits can be used to determine the row.

Once the fourth signal (Signal 4) is computed, an offset can be added to it. An offset is useful if the cache needs to accommodate multiple textures at the same time and a certain portion of the cache is allocated to each texture.

Although the invention has been described with a 128 entry cache, the number of entries in the cache can be varied. Also, the number of multi-bit signals can be varied, the XORing could be enhanced with a programmable logic function (such as AND, OR, NAND, NOR, XNOR), and the way to form the multi-bit signals (i.e. which bits of u, v and LOD are chosen for each signal) can be varied.

In addition to being used for graphics accelerator caches, this method can be used for selecting cache addressing functions for CPU caches. In CPU instruction and data caches, there is no concept of texture coordinates, but rather a memory address. By using a subset of the bits of a memory address instead of the image coordinates, the present invention can be used to offer programmability in the way data is cached. Such an implementation would allow a software program more choices when choosing a data caching function so that one may be selected based on the typical data access patterns.

While the invention has been described with reference to an exemplary embodiments various additions, deletions, substitutions, or other modifications may be made without departing from the spirit or scope of the invention. Accordingly, the invention is not to be considered as limited by the foregoing description, but is only limited by the scope of the appended claims.

What is claimed as new and desired to be protected by Letters Patent of the United States is:

1. A cache system, comprising:
    a memory, for storing at least one of: data and instructions;
    a processor, coupled to said memory; and
    a cache, coupled to said processor, said cache comprising:
        a first storage area, said first storage area comprising a plurality of entries; and
        a second storage area;
    wherein
        said cache is configured to store at least a portion of at least one of data and instructions, used by said processor, in said plurality of entries in accordance with a cache addressing function stored in said second storage area,
        said cache addressing function being a function of a multi-bit number stored in said second storage area after said cache has been fabricated.

2. The cache system of claim 1, wherein said cache addressing function is selected from at least one cache storage function stored in said second storage area.

3. The cache system of claim 2, wherein said cache addressing function is selected by said processor.

4. The cache system of claim 2, wherein each of said at least one cache storage function is stored in said second storage area after said cache has been fabricated.

5. The cache system of claim 1, wherein said second storage area is volatile.

6. The cache system of claim 1, wherein said multi-bit number is an address in said memory, and said cache addressing function is a direct mapping function for mapping between said address and said plurality of entries.

7. The cache system of claim 1, wherein said multi-bit number is an address in said memory, and said cache addressing function is a set associative function for mapping between said address and said plurality of entries.

8. The cache system of claim 1, wherein said multi-bit number comprises a level of detail (LOD) of a graphical object and said addressing function maps between said LOD and said plurality of entries.

9. The cache system of claim 1, wherein said processor is a central processing unit of a computer system.

10. The cache system of claim 1, wherein said processor is a graphical processor in a graphical system.

11. The cache system of claim 10, wherein said multi-bit number comprises a first address associated with a first dimension in a graphical space of said graphical processor and a second address associated with a second dimension in said graphical space of said graphical processor.

12. The cache system of claim 11, wherein said multi-bit number further comprises a level of detail (LOD) of a graphical object in said graphical space.

* * * * *

UNITED STATES PATENT AND TRADEMARK OFFICE
CERTIFICATE OF CORRECTION

| | |
|---|---|
| PATENT NO. | : 7,039,751 B2 |
| APPLICATION NO. | : 10/860013 |
| DATED | : May 2, 2006 |
| INVENTOR(S) | : Ole Bentz |

Page 1 of 1

It is certified that error appears in the above-identified patent and that said Letters Patent is hereby corrected as shown below:

In the Specification, the last two lines of the table in column 4 read:

"signal 3 [6] =      or 0

LOD[0]"

The two lines should be one, written as follows:

--signal 3 [6] = LOD [0] or 0--.

Signed and Sealed this

Twelfth Day of September, 2006

JON W. DUDAS
*Director of the United States Patent and Trademark Office*